(12) United States Patent
Bostick et al.

(10) Patent No.: US 10,170,102 B2
(45) Date of Patent: *Jan. 1, 2019

(54) AUTOMATIC ACCURACY ESTIMATION FOR AUDIO TRANSCRIPTIONS

(71) Applicant: International Business Machines Corporation, Armonk, NY (US)

(72) Inventors: James E. Bostick, Cedar Park, TX (US); John M. Ganci, Jr., Cary, NC (US); John P. Kaemmerer, Pflugerville, TX (US); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/960,590

(22) Filed: Apr. 24, 2018

(65) Prior Publication Data

US 2018/0247638 A1 Aug. 30, 2018

Related U.S. Application Data

(63) Continuation of application No. 15/815,066, filed on Nov. 16, 2017, now Pat. No. 10,002,606, which is a continuation of application No. 15/398,779, filed on Jan. 5, 2017, now Pat. No. 9,892,725, which is a continuation of application No. 15/172,531, filed on Jun. 3, 2016, now Pat. No. 9,570,068, which is a continuation of application No. 14/997,728, filed on
(Continued)

(51) Int. Cl.
*G10L 15/01* (2013.01)
*G06F 17/27* (2006.01)
*G10L 15/26* (2006.01)

(52) U.S. Cl.
CPC .......... *G10L 15/01* (2013.01); *G06F 17/2735* (2013.01); *G10L 15/265* (2013.01)

(58) Field of Classification Search
None
See application file for complete search history.

(56) References Cited

U.S. PATENT DOCUMENTS

| 3,969,700 A | 7/1976 | Bollinger et al. |
| 4,041,467 A | 8/1977 | Cota et al. |

(Continued)

OTHER PUBLICATIONS

IBM, "A Web-based Dynamic Domain Customization Method for Speech Transcription", IP.com No. IPCOM000180522D, Mar. 11, 2009, 5 pages.

(Continued)

*Primary Examiner* — Paras D Shah
*Assistant Examiner* — Jonathan Kim
(74) *Attorney, Agent, or Firm* — Jay Wahlquist; Maxine L. Barasch; Keohane & D'Alessandro, PLLC

(57) ABSTRACT

Embodiments of the present invention provide an approach for estimating the accuracy of a transcription of a voice recording. Specifically, in a typical embodiment, each word of a transcription of a voice recording is checked against a customer-specific dictionary and/or a common language dictionary. The number of words not found in either dictionary is determined. An accuracy number for the transcription is calculated from the number of said words not found and the total number of words in the transcription.

20 Claims, 4 Drawing Sheets

Related U.S. Application Data

Jan. 18, 2016, now Pat. No. 9,390,707, which is a continuation of application No. 13/463,055, filed on May 3, 2012, now Pat. No. 9,275,636.

(56) References Cited

U.S. PATENT DOCUMENTS

| | | | |
|---|---|---|---|
| 4,724,285 A | 2/1988 | Lefler et al. | |
| 4,783,761 A | 11/1988 | Gray et al. | |
| 4,797,855 A | 1/1989 | Duncan, IV et al. | |
| 4,864,501 A | 9/1989 | Kucera et al. | |
| 4,864,502 A | 9/1989 | Kucera et al. | |
| 4,888,730 A | 12/1989 | McRae et al. | |
| 5,148,367 A | 9/1992 | Saito et al. | |
| 5,332,143 A | 7/1994 | Furukawa et al. | |
| 5,715,469 A | 2/1998 | Aming | |
| 5,845,306 A | 12/1998 | Schabes et al. | |
| 5,875,443 A | 2/1999 | Nielsen | |
| 6,173,252 B1 | 1/2001 | Qiu et al. | |
| 6,272,456 B1 | 8/2001 | de Campos | |
| 6,332,143 B1 | 12/2001 | Chase | |
| 6,460,036 B1 | 10/2002 | Herz | |
| 6,618,697 B1 | 9/2003 | Kantrowitz et al. | |
| 6,865,258 B1 | 3/2005 | Polcyn | |
| 7,149,970 B1 | 12/2006 | Pratley et al. | |
| 7,194,684 B1 | 3/2007 | Shazeer | |
| 7,236,932 B1 | 6/2007 | Grajski | |
| 7,249,017 B2 | 7/2007 | Lucke et al. | |
| 7,251,665 B1 | 7/2007 | Dunning et al. | |
| 7,376,632 B1 | 5/2008 | Sadek et al. | |
| 7,380,203 B2 | 5/2008 | Keely et al. | |
| 7,613,667 B2* | 11/2009 | Coen | G06F 17/271 |
| | | | 700/16 |
| 7,689,431 B1 | 3/2010 | Carmel et al. | |
| 7,752,048 B2 | 7/2010 | Sprague et al. | |
| 7,958,127 B2 | 6/2011 | Edmonds et al. | |
| 7,983,910 B2 | 7/2011 | Subramanian et al. | |
| 8,010,344 B2 | 8/2011 | Zhang | |
| 8,051,088 B1 | 11/2011 | Tibbetts et al. | |
| 8,112,421 B2* | 2/2012 | Sun | G06F 17/30675 |
| | | | 707/737 |
| 8,161,073 B2 | 4/2012 | Connor | |
| 3,209,278 A1 | 6/2012 | Straus | |
| 8,315,878 B1 | 11/2012 | Burns et al. | |
| 3,412,517 A1 | 4/2013 | Zhang | |
| 3,447,604 A1 | 5/2013 | Chang | |
| 9,002,702 B2* | 4/2015 | Bostick | G10L 15/01 |
| | | | 704/9 |
| 9,208,146 B2* | 12/2015 | Gim | G06F 17/289 |
| 9,275,636 B2 | 3/2016 | Bostick et al. | |
| 9,390,707 B2 | 7/2016 | Bostick et al. | |
| 9,570,068 B2 | 2/2017 | Bostick et al. | |
| 9,892,725 B2 | 2/2018 | Bostick et al. | |
| 2002/0002459 A1 | 1/2002 | Lewis et al. | |
| 2002/0103834 A1* | 8/2002 | Thompson | G06F 17/277 |
| | | | 715/256 |
| 2003/0156754 A1 | 8/2003 | Ouchi | |
| 2003/0200093 A1 | 10/2003 | Lewis et al. | |
| 2004/0093567 A1 | 5/2004 | Schabes et al. | |
| 2005/0027664 A1 | 2/2005 | Johnson et al. | |
| 2005/0027717 A1 | 2/2005 | Koudas et al. | |
| 2005/0080613 A1* | 4/2005 | Colledge | G06F 17/2785 |
| | | | 704/9 |
| 2006/0212292 A1 | 9/2006 | Lauvergne et al. | |
| 2007/0005650 A1* | 1/2007 | Coen | G06F 17/271 |
| 2007/0033002 A1 | 2/2007 | Dymetman et al. | |
| 2007/0033044 A1 | 2/2007 | Yao | |
| 2007/0050182 A1 | 3/2007 | Sneddon et al. | |
| 2007/0074131 A1 | 3/2007 | Assadollahi | |
| 2007/0208567 A1 | 9/2007 | Armento et al. | |
| 2007/0208732 A1 | 9/2007 | Flowers et al. | |
| 2007/0219776 A1 | 9/2007 | Gamon et al. | |
| 2009/0019041 A1* | 1/2009 | Colando | G06F 17/30796 |
| 2009/0228274 A1 | 9/2009 | Terrell, II et al. | |
| 2009/0306969 A1 | 12/2009 | Goud et al. | |
| 2009/0319265 A1 | 12/2009 | Wittenstein et al. | |
| 2010/0042402 A1 | 2/2010 | Wick et al. | |
| 2010/0131900 A1 | 5/2010 | Spetalnick | |
| 2010/0145694 A1 | 6/2010 | Ju et al. | |
| 2011/0046953 A1 | 2/2011 | Arun et al. | |
| 2011/0078098 A1 | 3/2011 | Lapir et al. | |
| 2011/0153620 A1 | 6/2011 | Coifman | |
| 2011/0191286 A1 | 8/2011 | Cho et al. | |
| 2011/0191355 A1 | 8/2011 | Liang et al. | |
| 2011/0213613 A1 | 9/2011 | Cohen et al. | |
| 2011/0218804 A1* | 9/2011 | Chun | G06F 17/289 |
| | | | 704/243 |
| 2011/0288862 A1 | 11/2011 | Todic | |
| 2012/0078873 A1* | 3/2012 | Ferrucci | G06N 5/02 |
| | | | 707/708 |
| 2012/0096029 A1 | 4/2012 | Tamura et al. | |
| 2012/0128252 A1 | 5/2012 | Thorne | |
| 2012/0131015 A1* | 5/2012 | Al Badrashiny | G06F 17/273 |
| | | | 707/748 |
| 2012/0177291 A1* | 7/2012 | Gronau | G06K 9/00402 |
| | | | 382/190 |
| 2012/0226696 A1 | 9/2012 | Thambiratnam et al. | |
| 2012/0250985 A1 | 10/2012 | Xiao | |
| 2013/0110497 A1 | 5/2013 | Medero et al. | |
| 2013/0191114 A1* | 7/2013 | Gim | G06F 17/28 |
| | | | 704/9 |
| 2013/0297290 A1 | 11/2013 | Bostick et al. | |
| 2013/0297291 A1 | 11/2013 | Bostick et al. | |
| 2015/0154178 A1* | 6/2015 | Fang | G06F 17/2785 |
| | | | 704/9 |
| 2016/0085743 A1* | 3/2016 | Haley | G06F 17/28 |
| | | | 704/9 |
| 2016/0133247 A1 | 5/2016 | Bostick et al. | |
| 2016/0284342 A1 | 9/2016 | Bostick et al. | |
| 2017/0116979 A1 | 4/2017 | Bostick et al. | |

OTHER PUBLICATIONS

IBM, "Transcription of speech data with minimal manual effort", IP.com No. IPCOM000028925D, Jun. 8, 2004, 8 pages.

IBM, "Method and System of Automatically Constructing Domain-oriented Dynamic Polarity Dictionary for Sentiment Analysis", IP.com No. IPCOM000188595D, Oct. 15, 2009, 8 pages.

Axiom, "Offshore Voice Transcription", transcriptionoffshore.com/outsource-voice-transcription.html, Jan. 24, 2012, 2 pages.

David M. Kovacek, USPTO Office Action, U.S. Appl. No. 13/463,055, Notification dated Aug. 25, 2014, 25 pages.

David M. Kovacek, USPTO Final Office Action, U.S. Appl. No. 13/463,055, Notification dated Feb. 13, 2015, 16 pages.

David M. Kovacek, USPTO Notice of Allowance and Fee(s) Due, U.S. Appl. No. 13/463,055, dated Nov. 9, 2015, 15 pages.

Lamont M. Spooner, USPTO Office Action, U.S. Appl. No. 13/463,106, Notification dated Feb. 27, 2013, 22 pages.

Lamont M. Spooner, USPTO Final Office Action, U.S. Appl. No. 13/463,106, Notification dated Jun. 11, 2013, 22 pages.

Lamont M. Spooner, USPTO Office Action, U.S. Appl. No. 13/463,106, Notification dated Sep. 26, 2013, 22 pages.

Lamont M. Spooner, USPTO Final Office Action, U.S. Appl. No. 13/463,106, Notification dated Mar. 11, 2014, 22 pages.

Lamont M. Spooner, USPTO Office Action, U.S. Appl. No. 13/463,106, Notification dated Jul. 3, 2014, 14 pages.

Lamont M. Spooner, USPTO Notice of Allowance and Fee(s) Due, U.S. Appl. No. 13/463,106, dated Nov. 26, 2014, 11 pages.

David M. Kovacek, USPTO Notice of Allowance and Fee(s) Due, U.S. Appl. No. 14/997,728, dated Apr. 8, 2016, 31 pages.

David M. Kovacek, USPTO Notice of Allowance and Fee(s) Due, U.S. Appl. No. 15/172,531, dated Oct. 5, 2016, 23 pages.

David M. Kovacek, USPTO Office Action, U.S. Appl. No. 15/398,779, dated Apr. 5, 2017, 40 pages.

Jonathan C. Kim, USPTO Final Office Action, U.S. Appl. No. 15/398,779, dated Aug. 8, 2017, 15 pages.

Jonathan C. Kim, USPTO Notice of Allowance, U.S. Appl. No. 15/398,779, dated Sep. 21, 2017, 20 pages.

(56) References Cited

OTHER PUBLICATIONS

Jonathan C. Kim, USPTO Notice of Allowance, U.S. Appl. No. 15/815,066, dated Feb. 12, 2018, 29 pages.

* cited by examiner

US 10,170,102 B2

AUTOMATIC ACCURACY ESTIMATION FOR AUDIO TRANSCRIPTIONS

RELATED U.S. APPLICATION DATA

The present patent document is a continuation of U.S. patent application Ser. No. 15/815,066, filed Nov. 16, 2017, the entire contents of which are incorporated herein by reference. U.S. patent application Ser. No. 15/815,066 is a continuation of U.S. patent application Ser. No. 15/398,779, filed Jan. 5, 2017, U.S. Pat. No. 9,892,725, issued Feb. 13, 2018, the entire contents of which are incorporated herein by reference. U.S. patent application Ser. No. 15/398,779 is a continuation of U.S. patent application Ser. No. 15/172,531, filed Jun. 3, 2016, U.S. Pat. No. 9,570,068, issued Feb. 14, 2017, the entire contents of which are incorporated herein by reference. U.S. patent application Ser. No. 15/172,531 is a continuation of U.S. patent application Ser. No. 14/997,728, filed Jan. 18, 2016, U.S. Pat. No. 9,390,707, issued Jul. 12, 2016. U.S. patent application Ser. No. 14/997,728 is a continuation of U.S. application Ser. No. 13/463,055, filed May 3, 2012, U.S. Pat. No. 9,275,636, issued Mar. 1, 2016, the entire contents of which are incorporated herein by reference.

TECHNICAL FIELD

In general, embodiments of the present invention provide an approach for multimedia processing. Specifically, embodiments of the present invention relate to an approach for automatically estimating the accuracy level for audio transcriptions.

BACKGROUND

Recent advances in media conversion technology, such as speech-to-text conversion and optical character recognition (OCR), have made it possible for computers to perform tasks such as transcribing messages or documents dictated by a user. Dictation systems for personal computers are now fairly common. Also available are scanning or OCR systems that are capable of converting the content of a printed document into computer readable form. These systems, however, are sometimes inaccurate. The users often need to proofread and make corrections to the output of these systems.

Data entry personnel are currently utilized for the conversion of an audio message to a text message sent to a user's paging device. In such a system, a caller desiring to send a message telephones the user's paging service and communicates the message to a data entry employee of the paging service. This employee enters the message into a computer and then transmits it to the user's paging device. The text message entered by the employee of the paging service is then displayed on the display of the user's paging device. The use of human employees in the text entry and transcription of audio messages is expensive and inefficient. Current automated systems are not reliable and accurate enough to be used for a fully automated messaging or transcription system.

When documents are dictated and recorded as an audio file, a person transcribing the document plays the audio file and enters text representing the document recorded on the audio tape. The use of human employees in text entry and transcription of audio messages is expensive and inefficient. Automated speech-to-text conversion systems are also currently available to convert audio recordings into a text document. However, such conversion systems are inaccurate, requiring the users to proofread and make corrections to the output of the systems.

SUMMARY

In general, embodiments of the present invention provide an approach for estimating the accuracy of a transcription of a voice recording. Specifically, in a typical embodiment, each word of a transcription of a voice recording is checked against a customer-specific dictionary and/or a common language dictionary. The number of words not found in either dictionary is determined. An accuracy number for the transcription is calculated from the number of said words not found and the total number of words in the transcription.

A first aspect of the present invention provides a computer-implemented method for estimating the accuracy of a transcription of a voice recording, comprising: receiving the transcription; providing a customer specific dictionary; providing a dictionary of common language words; determining a number of inaccurate words in the transcription; determining a total number of words in the transcription; and calculating an accuracy number based on the number of inaccurate words and the total number of words.

A second aspect of the present invention provides a system for estimating the accuracy of a transcription of a voice recording, comprising: a memory medium comprising instructions; a bus coupled to the memory medium; and an audio transcription tool coupled to the bus that when executing the instructions causes the system to: receive the transcription; provide a customer specific dictionary; provide a dictionary of common language words; determine a number of inaccurate words in the transcription; determine a total number of words in the transcription; and calculate an accuracy number based on the number of inaccurate words and the total number of words.

A third aspect of the present invention provides a computer program product for estimating the accuracy of a transcription of a voice recording, the computer program product comprising a computer readable storage medium, and program instructions stored on the computer readable storage medium, to: receive the transcription; provide a customer specific dictionary; provide a dictionary of common language words; determine a number of inaccurate words in the transcription; determine a total number of words in the transcription; and calculate an accuracy number based on the number of inaccurate words and the total number of words.

A fourth aspect of the present invention provides a method for deploying a system for identifying commands for estimating the accuracy of a transcription of a voice recording, comprising: providing a computer infrastructure being operable to: receive the transcription; provide a customer specific dictionary; provide a dictionary of common language words; determine a number of inaccurate words in the transcription; determine a total number of words in the transcription; and calculate an accuracy number based on the number of inaccurate words and the total number of words.

BRIEF DESCRIPTION OF THE DRAWINGS

These and other features of this invention will be more readily understood from the following detailed description of the various aspects of the invention taken in conjunction with the accompanying drawings in which.

Figure 1:
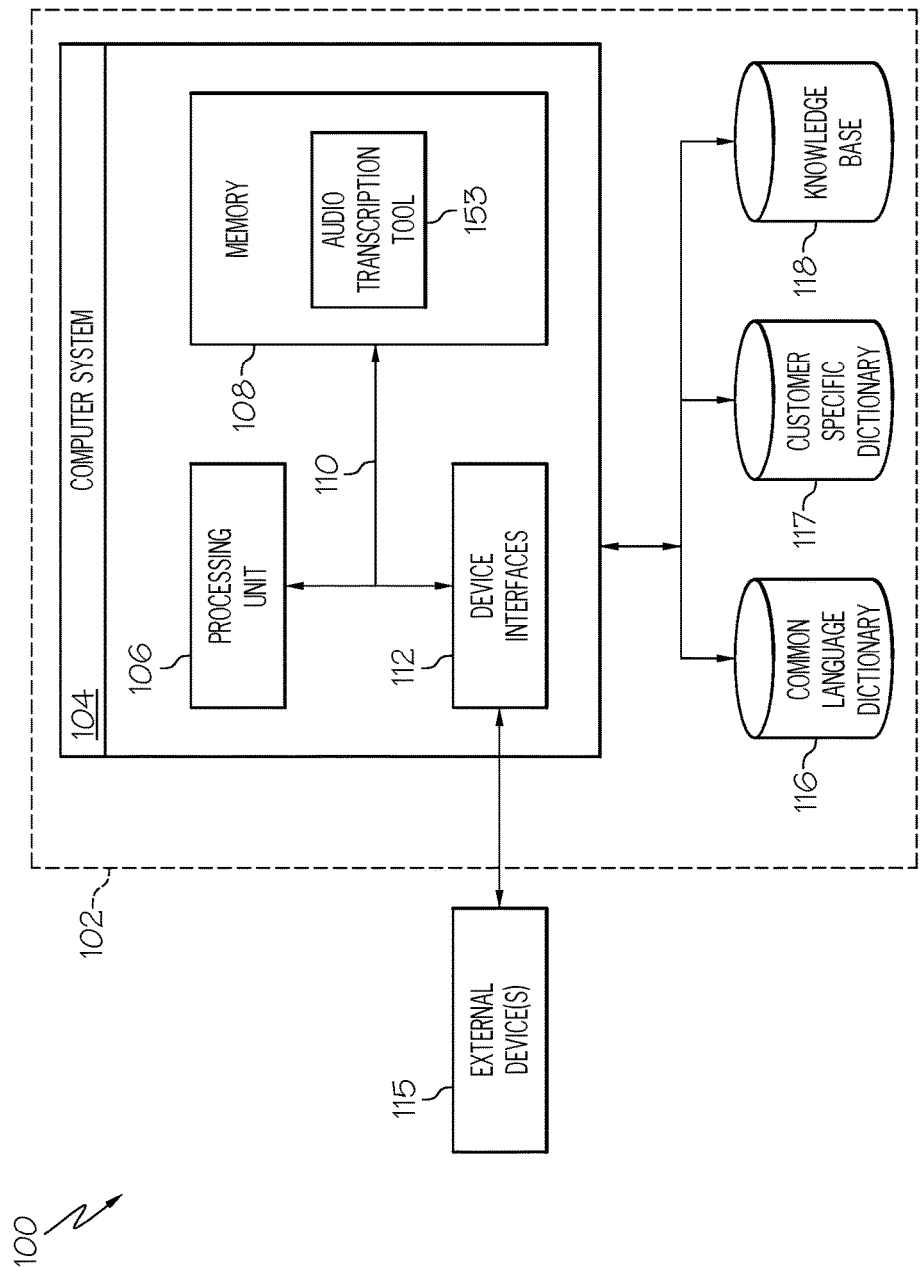
FIG. 1 shows a computerized implementation of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Embodiments of the present invention provide an approach for estimating the accuracy of a transcription of a voice recording. Specifically, in a typical embodiment, each word of a transcription of a voice recording is checked against a customer-specific dictionary and/or a common language dictionary. The number of words not found in either dictionary is determined. An accuracy number for the transcription is calculated from the number of said words not found and the total number of words in the transcription.

FIG. 1 illustrates a computerized implementation 100 of the present invention. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

Computer system 104 is intended to represent any type of computer system that may be implemented in deploying/realizing the teachings recited herein. In this particular example, computer system 104 represents an illustrative system for constructing a SOA shared service. It should be understood that any other computers implemented under the present invention may have different components/software, but will perform similar functions. As shown, computer system 104 includes a processing unit 106, memory 108 for storing an audio transcription tool 153, a bus 110, and device interfaces 112.

Processing unit 106 collects and routes signals representing outputs from external devices 115 (e.g., a keyboard, a pointing device, a display, a graphical user interface, etc.) to audio transcription tool 153. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different external devices may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 106 executes computer program code, such as program code for operating audio transcription tool 153, which is stored in memory 108 and/or storage system 116. While executing computer program code, processing unit 106 can read and/or write data to/from memory 108, common language dictionary 116, customer specific dictionary 117, and a knowledge base (KB) 118. Common language dictionary 116, customer specific dictionary 117, and a knowledge base (KB) 118 can include VCRs, DVRs, RAID arrays, USB hard drives, optical disk recorders, flash storage devices, or any other similar storage device. Although not shown, computer system 104 could also include I/O interfaces that communicate with one or more external devices 115 that enable a user to interact with computer system 104.

Figure 2:
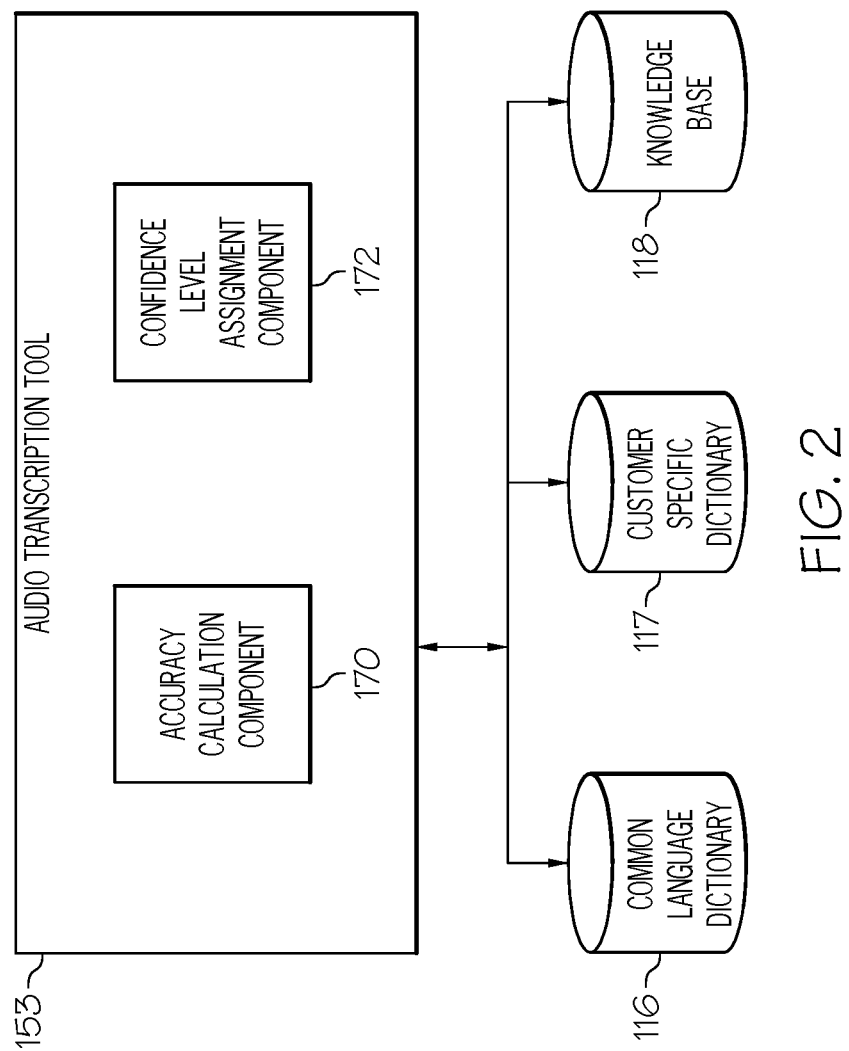
FIG. 2 shows a more detailed view of an example audio transcription tool according to an embodiment of the present invention.

FIG. 2 shows a more detailed view of an example audio transcription tool 153. Audio transcription tool 153 includes an accuracy calculation component 170 which calculates an accuracy of a transcription of a voice recording. In addition, the audio transcription tool 153 includes a confidence level assignment component 172 which assigns a confidence level to the transcription.

To determine a confidence level, a common language dictionary 116 and/or a customer specific dictionary 117 may be used. The common language dictionary 116 may include a listing of correctly spelled words or character strings for a particular natural language (e.g., English). As used herein, the term "natural language" includes all punctuation, symbols, and numeric characters associated with a particular natural language. In some examples, more than one common language dictionary may be used.

The customer specific dictionary may include a listing of useful terms in the customer domain. For example, a customer in a hardware/power tool line may be provided one or more lists of products (obtained via a database). In some examples, more than one customer specific dictionary may be used. In addition, one or more spell checkers may be used.

Knowledge base 118 may store various forms of knowledge. For example, knowledge base 118 may include automotive product information and customer shipping information. Knowledge base 118 is a collection of knowledge stored in the form of "axioms". An axiom is a statement or proposition that is regarded as being established, accepted, or self-evidently true. For example, storing genealogy information may include the following axioms:

Father(Bill, Sara)
Father(John, Bill)
Grandfather(x, z):=Father(x, y), Father(y, z)

The axioms listed above relate that Bill is the father of Sara, John is the father of Bill, and John is also the grandfather of Sara. Typically in building a KB (Knowledge Base), axioms are automatically extracted from data sources. Data sources are often free-form text. The process of extraction requires NLP (Natural Language Processing) to interpret a data source and find potential axioms in the data source. Axioms that are automatically discovered have a confidence level associated with them. An axiom of lowest confidence might be rated a "1" and an axiom of highest confidence might be rated a "10". Confidence levels may be used because several potential answers may exist when a KB is used to answer a question. The KB cannot determine which answer is correct, but can assign probabilities to the list (e.g., answer choice 1 has highest probability of 63%, answer choice 2 is 20%, answer choice 1 is 17%).

Consider a customer support center that receives many customer support calls. Each of the calls are to be transcribed. The calls are transcribed to text using software and recognized processes. However, the accuracy of the transcription may vary. Accuracy plays a large part in determining confidence levels. Confidence levels are relied upon by the KB to return accurate responses to a user. If a transcript is inaccurate, an attempt is still made to extract axioms. A low confidence level may be associated with these extracted axioms. If a transcript is accurate, a high confidence level may be associated with any extracted axioms from the transcript.

Figure 3:
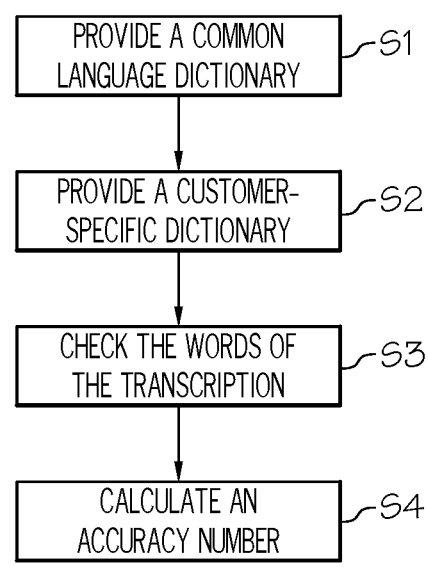
FIG. 3 shows a method flow diagram for estimating the accuracy of a transcription of a voice recording according to an embodiment of the present invention.

FIG. 3 shows a method flow diagram for estimating the accuracy of a transcription of a voice recording according to an embodiment of the present invention. At step S1, a common language dictionary 116 is provided. At step S2, a customer specific dictionary 117 is provided. At step S3, each word in the transcription of a voice recording are checked to determine whether the word exists in the common language dictionary 116 and/or the customer specific dictionary 117. In some examples, a spell check function is also performed on each word.

Any word that is not located in a dictionary and/or fails the spell check is determined to be an inaccurate word. For example, the word may be misspelled. The greater the number of inaccurate words, the more inaccurate the transcript. In step S4, an accuracy percentage may be calculated by simply dividing the number of accurate words by the total number of words in the transcript. In one example, longer words may be given more weight (e.g., words exceeding a predefined number of characters). The weighting is based on the assumption that longer words are more relevant. A Gaussian function may then be used to find an expected value and variance of each transcript per accuracy. A confidence level may be based on the output of the function.

Figure 4:
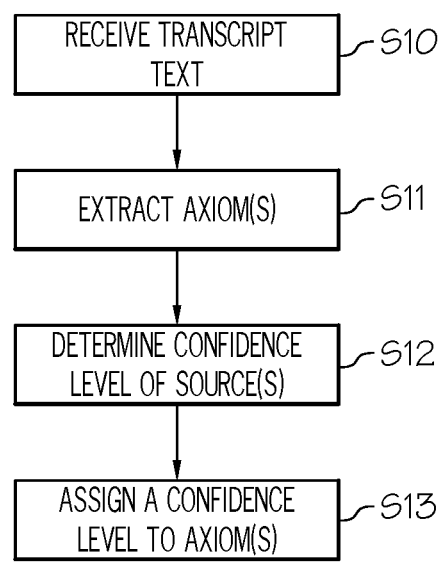
FIG. 4 shows a method flow diagram for assigning a confidence level to information extracted from a transcript of a voice recording according to an embodiment of the present invention.

FIG. 4 shows a method flow diagram for assigning a confidence level to information extracted from a transcript of a voice recording according to an embodiment of the present invention. In step S10, the transcript text of a voice recording is received. In step S11, an axiom related to the transcript text is extracted from a source. In step S12, a confidence level of the source is determined. In step S13, a confidence level is assigned to the axiom based on the confidence level of the source. In typical examples, more than one axiom is extracted related to the transcript text.

Axioms are used in the computation when performing audio-to-text transcribing to return results having confidence levels associated with them. The use of axioms in the computation increases the likelihood that at least one returned response to a question is an acceptable answer.

Below is an example of how the present invention may be used by an example company (e.g., company ABC) having the following business case. Company ABC has millions of products and cannot compete on the value of price. Company ABC encourages customers to call in and get world-class customer support from customer service agents (CSAs) prepared to answer any question regarding any matter related to the company. The company also allows CSAs to ship any part to any destination within 24 hours at no cost to the customer.

Two levels of technical support exist at company ABC: L1 and L2. L1 may have new employees and trainees and is only prepared to take easier calls. The L1 agents defer the more difficult calls to the L2 agents. L2 contains the more veteran employees who are prepared to answer any question. Company ABC wants to build a knowledge base (KB) that captures knowledge and information about products and how they are used. The goal is to keep the L1 agents from deferring calls to the L2 agents by allowing the L1 agents to query the KB to answer any difficult questions.

A customer calls the customer support line at Company ABC and says "I want a caulk for my kitchen". An L1 agent is unsure how to answer and decides to query the KB. The L1 agent manually types in "caulk for kitchen" or "I want a caulk for my kitchen", or the like. The KB brings back a response indicating three items that match the query. The L1 agent describes the results (i.e., the three items) to the customer, the customer chooses one of the items (e.g., caulk XYZ) and the call is closed.

There is no place within the structured company ABC databases that states that caulk XYZ is "for use in kitchens". If that data existed, then a search engine could return a result to the L1 agent. Rather, the structured company ABC data states that caulk XYZ meets the regulation 21 CFR 177.2600 specification (i.e., regulation number) and is used to get to the functional use (i.e., used in kitchens). CFR (Code of Federal Regulations) Title 21 is reserved for rules of the Food and Drug Adminstration. Unstructured data crawling is used to extract the following:

21 CFR 2700.600 has Agency FDA
21 CFR 2700.600 hasTopic Indirect Food Application
Indirect Food Application has Preferred Synonym Food Grade
Indirect Food Application has Environment Kitchen Each statement in the preceding extracted data list is an axiom. Each axiom comes from a different source. For example, sources may include PDFs, web pages, web forums, speech-to-text transcripts, and the like. In other words, anything that contains ASCII text may be a source candidate. A confidence level may be generated for each axiom because each source cannot be reviewed due the potential number of axioms and time constraints.

A confidence level is automatically associated with each source which corresponds to an axiom when an axiom is extracted from speech-to-text (as described earlier). Confidence level has to do with the confidence in the source data that the axioms come from. Using the examples from above, associated confidence levels for each source is shown in Table 1.

TABLE 1

| | |
|---|---|
| 21 CFR 2700.600 has Agency FDA | Confidence Level 5 |
| 21 CFR 2700.600 has Agency Topic Indirect Food Application | Confidence Level 4 |
| Indirect Food Application has Preferred Synonym Food Grade | Confidence Level 2 |
| Indirect Food Application has Environment Kitchen | Confidence Level 3 |

An algorithm using axioms in the computation to return final results to a customer adds the confidence levels together. The answer with the highest confidence level is most likely correct.

Further, it can be appreciated that the methodologies disclosed herein can be used within a computer system to provide an audio transcription service, as shown in FIG. 1. In this case, audio transcription tool 153 can be provided, and one or more systems for performing the processes described in the invention can be obtained and deployed to computer infrastructure 102. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

The exemplary computer system 104 may be described in the general context of computer-executable instructions, such as program modules, being executed by a computer. Generally, program modules include routines, programs, people, components, logic, data structures, and so on that perform particular tasks or implements particular abstract data types. Exemplary computer system 104 may be practiced in distributed computing environments where tasks are performed by remote processing devices that are linked through a communications network. In a distributed computing environment, program modules may be located in both local and remote computer storage medium including memory storage devices.

Furthermore, an implementation of exemplary computer system 104 may be stored on or transmitted across some form of computer readable media. Computer readable media can be any available media that can be accessed by a computer. By way of example, and not limitation, computer readable media may comprise "computer storage medium" and "communications media."

"Computer storage medium" include volatile and non-volatile, removable and non-removable media implemented in any method or technology for storage of information such as computer readable instructions, data structures, program modules, or other data. Computer storage medium includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for estimating the accuracy of a transcription of a voice recording. While the invention has been particularly shown and described in conjunction with a preferred embodiment thereof, it will be appreciated that variations and modifications will occur to those skilled in the art. Therefore, it is to be understood that the appended claims are intended to cover all such modifications and changes that fall within the true spirit of the invention.

What is claimed is:

1. A method of assigning a confidence level to at least one axiom extracted from text data, comprising:
   determining a number of accurate words in the text data based on a spell check function;
   dividing the number of accurate words from the text data by a total number of words in the text data;
   automatically extracting from a knowledge base stored in a computer infrastructure, the at least one axiom, wherein the axiom comprises a computer-parsable definition of a relationship of data to at least one of the words in the text data;
   assigning a confidence level to the at least one axiom based on an output of a Gaussian function applied to the result of the dividing;
   receiving a query from a user device, wherein the query includes at least one word;
   matching the at least one word with the at least one axiom using the knowledge base; and
   providing the at least one axiom from the knowledge base to the user device based on the matching and the assigned confidence level.

2. The method of claim 1, further comprising:
   comparing the text data to a dictionary.

3. The method of claim 2, wherein the determining the number of inaccurate words in the text data is further based on the comparing.

4. The method of claim 2, wherein the dictionary comprises a customer specific dictionary.

5. The method of claim 2, wherein the dictionary comprises a dictionary of common language words.

6. The method of claim 1, wherein the text data is extracted from multiple different sources.

7. The method of claim 1, wherein the confidence level is an indicator of accuracy of the text data.

8. The method of claim 1, wherein a solution service provider provides a computer infrastructure operable to perform the method.

9. A system for assigning a confidence level to at least one axiom extracted from text data, comprising:
   a memory medium comprising instructions;
   a bus coupled to the memory medium; and
   an audio transcription tool coupled to the bus that when executing the instructions causes the system to:
      determine a number of accurate words in the text data based on a spell check function;
      divide the number of accurate words from the text data by a total number of words in the text data;
      automatically extract from a knowledge base stored in a computer infrastructure, the at least one axiom, wherein the axiom comprises a computer-parsable definition of a relationship of data to at least one of the words in the text data;
      assign a confidence level to the at least one axiom based on an output of a Gaussian function applied to the result of the dividing;
      receive a query from a user device, wherein the query includes at least one word;
      match the at least one word with the at least one axiom using the knowledge base; and
      provide the at least one axiom from the knowledge base to the user device based on the matching and the assigned confidence level.

10. The system of claim 9, the audio transcription tool coupled to the bus that when executing the instructions further causes the system to:

compare the text to a dictionary.

11. The system of claim 10, wherein the dictionary comprises a customer specific dictionary or a dictionary of common language words.

12. The system of claim 11, wherein the determining is further based on the comparison.

13. The system of claim 9, wherein the text data is extracted from multiple different sources.

14. The system of claim 9, wherein the confidence level is an indicator of accuracy of the text data.

15. A computer program product for assigning a confidence level to at least one axiom extracted from a text, the computer program product comprising a computer readable hardware storage device, and program instructions stored on the computer readable hardware storage device, to:

determine a number of accurate words in the text data based on a spell check function;

divide the number of accurate words from the text data by a total number of words in the text data;

automatically extract from a knowledge base stored in a computer infrastructure, the at least one axiom, wherein the axiom comprises a computer-parsable definition of a relationship of data to at least one of the words in the text data;

assign a confidence level to the at least one axiom based on an output of a Gaussian function applied to the result of the dividing;

receive a query from a user device, wherein the query includes at least one word;

match the at least one word with the at least one axiom using the knowledge base; and provide the at least one axiom from the knowledge base to the user device based on the matching and the assigned confidence level.

16. The computer program product of claim 15, the computer program product comprising a computer readable storage medium, and program instructions stored on the computer readable storage medium, to:

compare the text data to a dictionary.

17. The computer program product of claim 16, wherein the dictionary comprises a customer specific dictionary or a dictionary of common language words.

18. The computer program product of claim 17, wherein the determining is further based on the comparison.

19. The computer program product of claim 15, wherein the text data is extracted from multiple different sources.

20. The computer program product of claim 15, wherein the confidence level is an indicator of accuracy of the text data.

* * * * *